July 9, 1935.  F. H. MÜLLER  2,007,283
METHOD OF PRODUCING TWO-COLOR OR MULTICOLOR PHOTOGRAPHIC PICTURES
Filed June 19, 1931
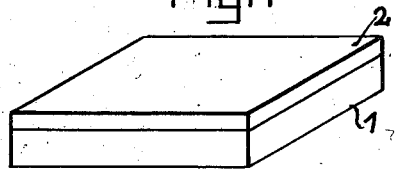
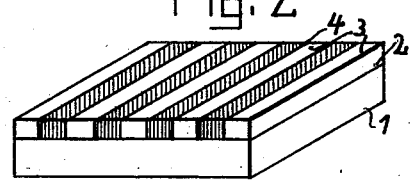
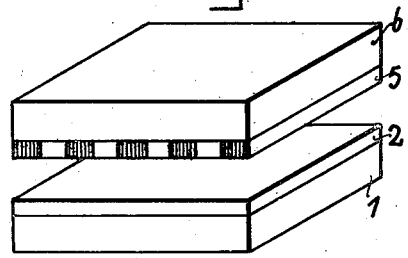
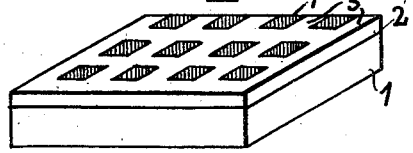
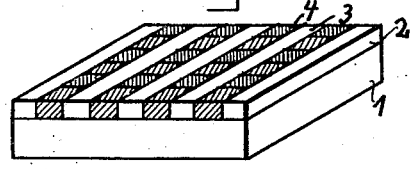
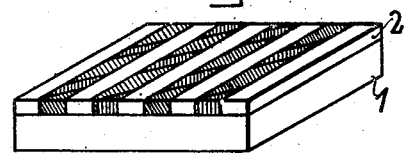
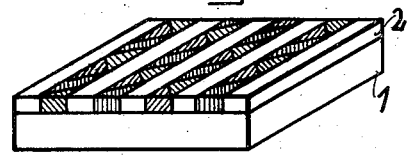
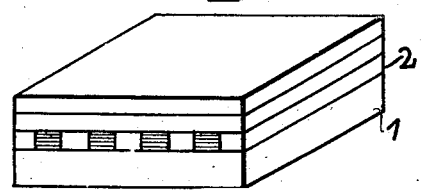

Patented July 9, 1935

2,007,283

UNITED STATES PATENT OFFICE 2,007,283

METHOD OF PRODUCING TWO-COLOR OR MULTICOLOR PHOTOGRAPHIC PICTURES

Franz Hubert Müller, Bielefeld, Germany, assignor to Durkopp-Werke A.-G., Bielefeld, Germany Application June 19, 1931, Serial No. 545,493
In Germany June 1, 1931

2 Claims. (Cl. 95—2)

This invention relates to a process for producing two or multi-colored photographic pictures and consists in photographically printing the picture from a multicolored negative plate or film onto a positive paper provided with a multicolor screen containing pure white besides the colors.

Several embodiments of the invention are illustrated by way of example in the accompanying drawing in which:—

Figs. 1 to 5 show the different stages in the production of a two-colored picture.

Fig. 6 shows the employment of the negative pellicle as screen for the paper.

Figs. 7 and 8 show the production of a three color paper picture.

According to Figs. 1 to 5 pure white paper 1 is coated with a thin gelatine layer 2, sensitized by means of a bichromate and dried for the purpose of producing a two colored positive. The screen lines 3, 4 are copied on this layer in such a manner that the light and dark screen lines are of uniform thickness, the light lines being hardened in the gelatine layer (Fig. 2). The gelatine is then colored red or green and the white lines being hardened do not absorb the color but remain white. These lines serve for brightening the picture to be subsequently produced. The paper with the gelatine is then sensitized in a solution of potassium or ammonium chromate. A second screen is then copied at right angles to the first, in which second screen the light and dark lines are likewise of uniform thickness. The non-hardened red or green portions are then removed from the gelatine by washing (Fig. 3) and colored green or red. After the second coloring, the paper is placed in a bath of potassium permanganate in order to remove the second color which has deposited also to a certain extent on the portions of the gelatine which are colored and hardened. Owing to the potassium permanganate bath however the entire layer becomes slightly brown and this brown coloring is again removed by a suitable bath of potassium metal bisulphite. The colors are also made purer and brighter by these baths. The paper is then washed, dried, coated with varnish and provided with a layer of panchromatic only slightly sensitive emulsion (Fig. 5).

This paper thus produced which may be either transparent or translucent must be illuminated alternately with red and green light from the rear side for producing the colored picture. The colored illumination is necessary because the screen printed on the paper is purposely weak as otherwise the colors would be much too dark in the finished picture.

The white lines included in the screen serve for brightening the picture. Both the plate colored screen and also the white lines are necessary because a reflection and consequently a strengthening of the colors is caused by the white paper. The development and printing is effected in a similar way to that of a black and white picture and must be carried out in a green light.

According to Fig. 6 the clear white paper 1 is prepared in such a manner that the paper fibres do not absorb any color and then coated with a slightly sensitive panchromatic emulsion. The screen 5 to be printed thereon is applied on a film 6 which is coated with collodion and serves subsequently for stripping the pellicle. This pellicle is coated with a thin layer of gelatine and then sensitized by means of a bichromate. The screen lines are applied in the same way, then colored weak red, sensitized by means of a bichromate, whereupon the second screen is printed at right angles to the first, the non-hardened red color is then removed by washing, and weak green applied. The covering colors are removed by oxidation, after which the prepared paper is united with the pellicle 6, and this pellicle which was previously coated with collodion, is stripped, so that the screen 5 is applied to the gelatine 2. The weak color screen thus obtained is necessary because the color effect in the picture is doubled by the reflection. For separating the colors during the copying this weak color screen is not sufficient, consequently red and green filters are alternately arranged in front thereof during the exposure.

According to Figs. 7 and 8 for producing a three colored paper picture a clear white paper 1 is coated with a thin layer of gelatine 2, sensitized by means of a bichromate and dried, whereupon the screen lines are printed, so that the light lines 3 and the dark lines 4 are of uniform width. The gelatine under the lines 3 is hereby also hardened and the gelatine colored red, the hardened lines remaining white. After the coloring the gelatine is sensitized by means of a bichromate and dried, and a second screen printed thereon at an angle of 45° to the first screen, the light lines of this second screen being twice as wide as the dark lines thereof. After the printing the non-hardened red portions are removed by washing and these portions colored blue and then resensitized (Fig. 7) whereupon screen lines are photographically printed at right angles to the second screen, the dark lines of this third screen being of the same width as the light lines. The blue color under the light lines of the screen is hardened and the non-hardened blue portions are removed by washing to such an extent that, when the paper is subsequently dipped in an additional yellow bath, a green color is obtained (Fig. 8). After this coloring the paper is placed in a potassium permanganate bath and then in a potassium metabisulphate bath, the paper being subsequently washed, dried, coated with varnish and a panchromatic slightly sensitive emulsion applied to the layer.

For positive papers, transparent paper which must be whitened after the printing of the picture may also be employed instead of pure white paper.

The point color screen plates already on the market may be employed as negative for producing the paper pictures prepared as above described. Point color screens cannot be employed for the positive paper pictures because they on the one hand are too strongly colored and on the other hand contain no pure white and are too irregular.

I claim:

1. A method for producing a sensitized paper provided with a multi-colored screen, said method consisting of preparing printing paper by coating pure white paper with a thin gelatine layer, then sensitizing the gelatine layer, then printing screen lines of uniform thickness thereon, then applying red color matter for adherence to the unhardened areas and leaving the hardened areas white, then resensitizing the layer, then printing a second line screen thereon at right angles to the first, then washing the red color from the remaining unhardened areas, then applying a green coloring matter, then removing the overlapping color and finally varnishing the layer and coating with a panchromatic emulsion.

2. A method for producing an opaque sensitized paper provided with a multi-colored screen, said method consisting of applying a thin layer of gelatine on pure white paper, then sensitizing the layer, then photographically printing a line screen thereon, then applying red color to the layer then again sensitizing the layer, then photographically printing a second line screen thereon displaced 45° relative to the first screen with the dark lines of the screen being twice as wide as the transparent lines, then washing out the red from the unhardened points, then applying blue color, then again sensitizing the layer, then photographically printing a third line screen perpendicularly to the second screen with the dark lines of this last screen being exactly the same thickness as the transparent lines then weakening the blue at the unhardened points, then coloring the weakened blue portions yellow to form green, then removing the superposed color, then varnishing the layer and then coating the layer with a slightly sensitive panchromatic emulsion.

FRANZ HUBERT MÜLLER.